United States Patent
Khosravirad et al.

(10) Patent No.: US 12,273,733 B2
(45) Date of Patent: Apr. 8, 2025

(54) METHOD AND APPARATUS FOR IMPROVING RELIABLE AND LOW-LATENCY COMMUNICATION UPLINK TRANSMISSION IN THE UNLICENSED SPECTRUM

(71) Applicant: Nokia Technologies Oy, Espoo (FI)

(72) Inventors: Saeed Reza Khosravirad, Ontario (CA); Adrian Garcia Rodriguez, Blanchardstown (IE); Harish Viswanathan, Morristown, NJ (US)

(73) Assignee: Nokia Technologies Oy, Espoo (FI)

( * ) Notice: Subject to any disclaimer, the term of this patent is extended or adjusted under 35 U.S.C. 154(b) by 485 days.

(21) Appl. No.: 17/770,834

(22) PCT Filed: Oct. 22, 2019

(86) PCT No.: PCT/EP2019/078631
§ 371 (c)(1),
(2) Date: Apr. 21, 2022

(87) PCT Pub. No.: WO2021/078363
PCT Pub. Date: Apr. 29, 2021

(65) Prior Publication Data
US 2023/0021531 A1    Jan. 26, 2023

(51) Int. Cl.
*H04W 88/06*   (2009.01)
*H04W 16/14*   (2009.01)
(Continued)

(52) U.S. Cl.
CPC ....... *H04W 16/14* (2013.01); *H04W 74/0816* (2013.01)

(58) Field of Classification Search
CPC .. H04W 16/14; H04W 74/0816; H04W 76/18
See application file for complete search history.

(56) References Cited

U.S. PATENT DOCUMENTS

2016/0227578 A1\*   8/2016   Lee .................... H04W 74/004
2018/0092128 A1\*   3/2018   Um .................... H04W 74/006
(Continued)

OTHER PUBLICATIONS

3GPP TSG RAN WG1 Meeting#85, R1-164604 Title:LBT for Frequency reuse and Multiplexing in Uplink (Year: 2016).\*
(Continued)

*Primary Examiner* — Faruk Hamza
*Assistant Examiner* — Abusayeed M Haque
(74) *Attorney, Agent, or Firm* — McCarter & English LLP

(57) ABSTRACT

A system in wireless network including an Access Point utilizing at least an unlicensed first wireless interface; a Station utilizing at least a first unlicensed wireless interface, transmitting in uplink to the AP; Said at least one STA further includes a secondary wireless interface different from the first unlicensed wireless interface, said STA is configured to, determine that transmission of a message be in a secondary wireless interface of the STA when it is utilized for Reliable and Low Latency Communication RLLC data transmission, generate a message and then transmit the message to a serving AP. Said AP is configured to, when receiving the message from the STA, determine whether information will be generated based on the message received from the STA, generate at least scheduling information and transmit the generated information to the STA.

19 Claims, 5 Drawing Sheets

(51) Int. Cl.
*H04W 74/0816* (2024.01)
*H04W 76/18* (2018.01)

(56) References Cited

U.S. PATENT DOCUMENTS

| | | | |
|---|---|---|---|
| 2018/0176953 A1* | 6/2018 | Hampel | H04W 74/0816 |
| 2019/0029052 A1* | 1/2019 | Yang | H04L 1/1864 |
| 2019/0036831 A1* | 1/2019 | Li | H04W 72/23 |
| 2019/0380148 A1* | 12/2019 | Dudda | H04W 74/02 |
| 2020/0008240 A1* | 1/2020 | Golitschek Edler von Elbwart | H04W 72/0446 |

OTHER PUBLICATIONS

3GPP TSG-RAN Meeting#86bis, R1-1610859 Title: Draft CR on clearification of PUSCH start position for eLAA (Year: 2016).*
3GPP TSG RAN WG2#118-e, R2-2206765 Title:LS on Rel-17 RAN4 UE feature list NR (Year: 2022).*

* cited by examiner

STA implementation

AP implementation

METHOD AND APPARATUS FOR IMPROVING RELIABLE AND LOW-LATENCY COMMUNICATION UPLINK TRANSMISSION IN THE UNLICENSED SPECTRUM

CROSS REFERENCE TO RELATED APPLICATION

This patent application is a U.S. National Stage application of International Patent Application Number PCT/EP2019/078631 filed Oct. 22, 2019, which is hereby incorporated by reference in its entirety.

TECHNICAL FIELD

Various example embodiments relate generally to methods and apparatus for improving uplink transmission in the unlicensed spectrum. They may further relate to the prevention and/or fast reaction to channel access delays for low-latency applications.

BACKGROUND

In the current trends of standard and product development for (Ultra-Reliable and Low Latency Communication ("URLLC"), and specifically for factory automation and motion control use cases, the requirement of high availability of wireless communication services within a limited time budget of 0.5-2 ms is targeted. Within this framework, both 3GPP and IEEE are eyeing at solutions to enhance the latency and reliability of unlicensed spectrum operations. The solutions are expected to be applicable to and be implemented in both 802.11 and New Radio Unlicensed (NR-U) devices.

In some geographical regions, it is mandatory to perform a Listen-Before-Talk ("LBT") operation, implemented at devices operating in the unlicensed spectrum and licensed assisted access (LAA). As per the LBT operation, a station (STA) in the wireless communication network senses the channel in a passive manner, for example based on Carrier-Sense Multiple Access ("CSMA"), and can only continue transmission if the channel is not occupied. Consequently, the LBT process will inherently increase the access and end-to-end ("E2E") experienced latency for different applications. Notably, in case of RLLC, the service requirements may even be failed.

SUMMARY

According to embodiments of the invention, a system in a wireless network comprising at least a Basic Service Set BSS comprising:
  at least an Access Point AP utilizing at least an unlicensed first wireless interface;
  at least one Station STA utilizing at least a first unlicensed wireless interface, transmitting in uplink to the AP;
  said at least one STA further comprises a secondary wireless interface being different from the first unlicensed wireless interface, said STA is configured to, when identifying an unavailability of a first channel utilized in the unlicensed first wireless interface, determine that transmission of a message be in a secondary wireless interface of the STA when it is utilized for Reliable and Low Latency Communication RLLC data transmission, generate a message and then transmit the message to a serving AP;
  said serving AP is configured to, when receiving the message from the STA, determine whether information will be generated based on the message received from the STA, generate at least scheduling information if it is determined that information will be generated and transmit the generated information to the STA.

Some embodiments comprise one or more of the following features, which can be taken separately or together, either in partial combination or in full combination:
  said message is preferably a frame, comprising at least: a first field (F1), indicating that the first channel utilized by the unlicensed first wireless interface for uplink RLLC data transmission is identified as unavailable; and a second field (F2), indicating whether the transmission of the frame is triggered when: a) performing the countdown of a mandatory LBT phase prior to the uplink RLLC data transmission; or b) monitoring channels without attempting data;
  said message further comprises: a third field (F3), being an indication of channel occupation information of an unoccupied secondary channel in the same frequency band of the unlicensed first wireless interface, being provided if the STA implements the capability of sensing multiple channels, comprising: secondary channels; or other channels not being utilized as secondary bonding channels;
  said message further comprises: a fourth field (F4), comprising the data payload for STA uplink transmission, if a) the STA identifies unavailability of a first channel utilized by the unlicensed first wireless interface for STA when performing LBT; and b) the data payload to be transmitted satisfies conditions specified by the serving AP.

According to embodiments of the invention, a Station STA utilizing at least an unlicensed first wireless interface transmitting in uplink to a serving AP of a same Basic Service Set BSS in a wireless network, said STA comprises:
  a second wireless interface being different from the unlicensed first wireless interface;
  an identification unit, being configured to identify that a first channel utilized by the unlicensed first wireless interface is unavailable for the STA;
  a determination unit, being configured to, when identifying that the first channel utilized by the unlicensed first wireless interface is unavailable for the STA, determine that transmission of a message be in a secondary wireless interface of the STA if said STA attempts to transmit Reliable and Low Latency type traffic;
  a message generation unit, being configured to generate a message to be sent to the serving AP; and
  a STA transmission unit, transmitting the message to the serving AP.

Some embodiments comprise one or more of the following features, which can be taken separately or together, either in partial combination or in full combination:
  said identification unit is configured to, when an interfering device is utilizing the same unlicensed channel for data transmission, identify that the first unlicensed channel is unavailable for the STA;
  said message generating unit is configured to generate a message comprising at least: a first field (F1), indicating that the first unlicensed channel utilized by the unlicensed first wireless interface for uplink RLLC data transmission is identified as unavailable; and a second field (F2), indicating whether the transmission of the frame is triggered when: a) performing the countdown of a mandatory LBT phase prior to the uplink RLLC data transmission; or b) monitoring channels without attempting data;

said message generating unit comprises: a data payload analysis unit, being configured to determine whether to include data payload in the message; and a channel occupancy information unit, being configured to obtain channel occupancy information based on the capability of STA for sensing multiple channels.

According to embodiments of the invention, an Access Point AP utilizing at least an unlicensed first wireless interface in communication with at least one associated STA of a same Basic Service Set BSS in a wireless network, said AP comprises:

a secondary wireless interface being different from the unlicensed first wireless interface;

a reception unit, being configured to receive the message transmitted from the at least one associated STA;

an information generation determining unit, being configured to determine whether information will be generated based on the message received from the associated STA;

an information generation unit, being configured to generate at least scheduling information for the STA based on the availability of a first channel in the unlicensed first wireless interface for the AP if it is determined that information will be generated; and an AP transmission unit, being configured to transmit the generated information to the associated STA.

Some embodiments comprise one or more of the following features, which can be taken separately or together, either in partial combination or in full combination:

said information generation determining unit, being configured to determine that information will be generated if the message received from the associated STA comprises data payload for STA uplink transmission (F4);

said scheduling information determined for the associated STA comprises: AP scheduling STA for uplink data transmission in a secondary wireless interface different from the first wireless interface if the first channel in the first wireless interface is not available for the AP; or AP scheduling STA for uplink data transmission in a secondary channel in the first wireless interface if the first channel in the first wireless interface is available for the AP;

said information generation unit further comprising a channel selection unit, being configured to select a secondary channel based on a message received from an associated STA after it is determined that AP schedules STA for uplink RLLC data transmission in a secondary channel in the first wireless interface.

According to embodiments of the invention, a method for communicating between an Access Point AP utilizing at least one unlicensed first wireless interface of a BSS, and at least one Station STA transmitting in uplink to the AP utilizing at least an unlicensed first wireless interface of the same BSS, in a wireless network;

said at least one STA further utilizing a secondary wireless interface, the at least one AP further utilizing a secondary wireless interface, said method comprising the steps of:

said STA identifying an unavailability of a first channel utilized by the unlicensed first wireless interface for uplink RLLC data transmission;

said STA determining transmission of a message in a secondary wireless interface of the STA when being utilized for RLLC data transmission;

said STA generating a message to be sent to the AP;

said STA transmitting the message to the AP;

said AP receiving the message from the STA;

said AP determining whether information will be generated based on the message received from the STA;

said AP generate at least scheduling information based on the availability of a first channel of the first unlicensed wireless interface for the AP if it is determined that information will be generated; and said AP transmitting the generated information to the AP.

According to embodiments of the invention, a method for use by a STA utilizing at least a first wireless interface in a BSS, transmitting in uplink to a serving AP of the same BSS in a wireless network, said STA further utilizing a secondary wireless interface, said method comprises the step of:

identifying that a first channel utilized by the unlicensed first wireless interface is not available for the STA;

determining that transmission of a message be in a secondary wireless interface of the STA in a secondary wireless interface of the STA if the STA attempts to transmit Reliable and Low Latency type traffic;

generating a message to be sent to the serving AP; and transmitting the message to the serving AP.

Some embodiments comprise one or more of the following features, which can be taken separately or together, either in partial combination or in full combination:

said identifying the unavailability of a first channel utilized by the unlicensed first wireless interface for the STA comprises observing when an interfering device is utilizing the same unlicensed channel for data transmission;

said generating a message to be sent further comprises the steps of: determining whether to include data payload in the message; and determining channel occupancy information to be obtained based on the capability of STA for sensing multiple channels;

it is determined to include data payload in the message if: the unavailability of the first channel in the unlicensed first wireless interface is identified by the STA when performing Listen-Before-Talk LBT operation; and the data payload to be transmitted by the STA satisfies conditions specified by a serving AP;

said determining channel occupancy information to be obtained comprises: providing channel occupancy information in the message to be sent to the serving AP if the STA has the capacity of sensing multiple channels;

said channel occupancy information indicating unoccupied unlicensed channels in the same frequency band of the unlicensed first wireless interface comprises: secondary channels; or other channels not currently utilized as secondary bonding channels.

According to embodiments of the invention, a method for use by an AP utilizing at least a first wireless interface in a BSS in a wireless network, said AP further utilizing a secondary wireless interface, said method comprises the steps of:

receiving the message transmitted from an associated STA of the same BSS;

determining whether information will be generated based on the message received from the STA;

generating at least scheduling information for STA based on the availability of a first channel in the unlicensed first wireless interface to the AP if it is determined that information will be generated; and transmitting the generated information to the AP.

Some embodiments comprise one or more of the following features, which can be taken separately or together, either in partial combination or in full combination:

- it is determined that information will be generated if the message received from the associated STA comprises data payload for STA uplink transmission (F4);
- said generating at least scheduling information for STA comprises evaluating the availability of the first channel in the first wireless interface for AP: if the first channel in the first wireless interface is not available for AP, AP schedules STA for uplink data in a second wireless interface rather than a first wireless interface; and if the first channel in the first wireless interface is available for AP, AP schedules STA for uplink data transmission in a secondary channel in the unlicensed first wireless interface;
- said transmitting the generated information to STA may further comprise transmitting the scheduling information in the first channel of the first wireless interface; or transmitting scheduling information in the secondary wireless interface;
- said generating at least scheduling information for STA comprises when the first channel in the first wireless interface is not available for AP, AP scheduling STA for transmission of data payload in a second wireless interface and AP deciding to change the first channel in the first wireless interface;
- said generating at least scheduling information for STA comprises after it is determined that AP schedules STA for uplink RLLC data transmission in a secondary channel in the unlicensed first wireless interface, selecting a secondary channel based on a message received from an associated STA;
- said selecting a secondary channel further comprises: sensing the medium in the primary data channel with extended listening range to select a secondary channel if a channel occupation information is not included in the message received from the associated STA; or selecting a secondary channel based on the channel occupation information included in the message received from the associated STA;
- said channel occupation information is an indication of unoccupied secondary channel in the same frequency band of the unlicensed first wireless interface, being provided if the STA implements the capability of sensing multiple channels.

According to embodiments of the invention, a computer readable storage medium storing instructions which, when executed by a computer, cause the computer to perform a method as previously defined.

According to embodiments of the invention, a network communication entity for providing fast listen-before-talk LBT failure reaction, comprising at least one AP utilizing at least a first wireless interface and at least one associated STA utilizing at least a first wireless interface, transmitting in uplink to the AP, said at least one associated STA further comprises a secondary wireless interface and the AP further comprises a secondary wireless interface, and said network communication entity further comprises:

- Means for identifying an unavailability of a first channel utilized by an unlicensed first wireless interface for a STA transmitting uplink RLLC data;
- Means for determining transmission of a message in a secondary wireless interface of the STA;
- Means for generating a message and transmitting the message to a serving AP.
- Means for receiving the message from the STA; and
- Means for determining whether information will be generated;
- Means for generating and transmitting at least scheduling information to the AP.

Further features and advantages of the invention will appear from the following description of embodiments of the invention, given as non-limiting examples, with reference to the accompanying drawings listed hereunder.

BRIEF DESCRIPTION OF THE DRAWINGS

Example embodiments will now be described with reference to the accompanying drawings, in which.

DETAILED DESCRIPTION

Example embodiments will now be described, including methods and apparatus for improving uplink transmission in the unlicensed spectrum, and in particular methods and apparatus for prevention and/or fast reaction to channel access delays for low-latency applications.

Functional blocks denoted as "means configured to perform . . . " (a certain function) shall be understood as functional blocks comprising circuitry that is adapted for performing or configured to perform a certain function. A means being configured to perform a certain function does, hence, not imply that such means necessarily is performing said function (at a given time instant). Moreover, any entity described herein as "means", may correspond to or be implemented as "one or more modules", "one or more devices", "one or more units", etc. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional or custom, may also be included. Their function may be carried out through the operation of program logic, through dedicated logic, through the interaction of program control and dedicated logic, or even manually, the particular technique being selectable by the implementer as more specifically understood from the context.

Figure 1:
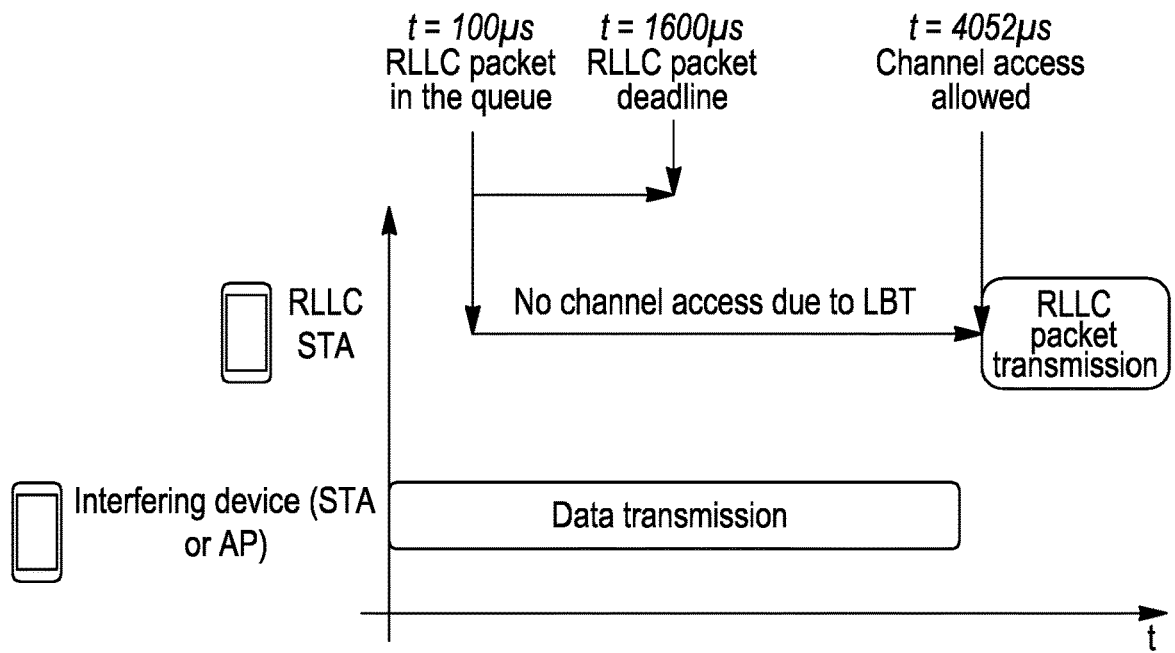
FIG. 1 illustrates an example of the channel access delay problem due to the LBT operation.

With reference to FIG. 1, a problem of channel access delay, resulted from the LBT operation in Wireless communication network will be illustrated.

FIG. 1 shows two STAs namely an RLLC STA, and an interfering STA both in a wireless communication network.

Although not shown in FIG. 1, it is to be understood that the wireless communication network may comprise at least one Basic Service Set ("BSS") comprising at least a serving AP, and at least one STA (such as an RLLC STA, being a STA utilized for transmitting RLL type traffic; a broadband traffic STA, being a STA utilized for transmitting broadband type traffic) associated to the serving AP. The at least one STA wishes to transmit in uplink to the serving AP. The wireless communication network may comprise an interfering device such as an interfering STA or an interfering AP that generates interference to the at least one STA. Such interference may be generated when there is an overlapping area between the coverage area of the serving AP of the BSS and the coverage area of the interfering device. The interfering device may be an "intra-BSS interfering device" or an "inter-BSS interfering device" depending on whether it belongs to the same BSS as the STA being interfered with or not.

In the situation illustrated by FIG. 1, at t=0 ms, the interfering STA initiates a transmission with a duration length of 4000 μs. At t=100 μs, the RLLC STA receives an uplink RLL packet in its queue for transmission. The packet has a latency deadline of $t_d$=1500 μs. Upon reception of the packet at the MAC layer, the RLLC STA will start performing the LBT operation. During the LBT operation, the RLLC STA senses the channel as busy and has to wait until the transmission of the interfering STA finishes at t=4000 μs. At t=4000 μs, the RLLC STA senses the channel as free and initiates the random back-off process for channel access and then, at t=4052 μs, the RLLC can access the channel and perform the RLLC. However, the latency deadline of $t_d$=1500 μs has been missed.

In the example illustrated by FIG. 1, channel occupancy issues can introduce intolerable channel access delays for low-latency applications and thus resulting in the failing of the service requirements.

Several methods have been proposed to address this technical problem, and they are far from being satisfactory.

One method proposes to utilize multiple primary channels in 802.11, where the device attempting channel access executes LBT in multiple unlicensed spectrum channels simultaneously. However, the utilization of multiple primary channels requires the device attempting channel access to execute a simultaneous LBT in multiple channels continuously, which would increase the complexity and power consumption of the devices. In addition, this method is based on blind over-provisioning of resources for packets which results in high inefficiency and is not a scalable solution. Furthermore, as this method is focused on 802.11 devices, it does not consider the case of having access to a wireless interface operating in the licensed spectrum at all.

Another method is proposed using packet duplication in multiple wireless interfaces, that is, Package Data Convergence Protocol ("PDCP") duplication in 3GPP New Radio or duplication at the application layer while exploiting multiple radio access technologies.

It is to be noted that different wireless interfaces in the context of the invention refer to different frequency bands supported by various radio access technologies. For instance, the wireless frequency bands may be WiFi 2.4 GHz, and Wifi 5 GHz. Each of these wireless interfaces i.e. frequency bands may comprise one or multiple channels.

Although this method allows devices to have access to both unlicensed and licensed spectrums, it does not overcome the drawbacks brought by the blind over-provisioning of resources. Moreover, as over-provisioning of the resources can increase the load in each channel, this results in high channel occupancy rate with even more traffic generated per channel.

Still another method is proposed to solve the problem by Massive MIMO unlicensed (mMIMO-U). In this method, the device attempting channel access to the unlicensed spectrum (mMIMO-U AP) utilizes a spatial filter during the LBT and data transmission phases with the purpose of spatially suppressing the signals from the device that prevented channel access during LBT to facilitate channel access, and suppressing the signals towards the device that prevented channel access during data transmission. Although this enables the mMIMO-U AP to access the unlicensed spectrum even when there is a neighboring device transmitting, this method has some crucial drawbacks: 1) the application of a spatial filter during the mandatory LBT phase is not currently allowed by unlicensed spectrum regulations; and 2) this method is only applicable to devices equipped with multiple antennas thus dramatically compromising the multitude of devices operating in industry environments.

Still another method proposes adopting RTS/CTS mechanism. However, this method is not an effective solution to the problem illustrated in FIG. 1 since the RLLC STA for uplink transmission cannot access the channel to transmit RTS (the device that transmitted the RTS frame will proceed with the downlink transmission), and the serving AP is not aware of the STA's sudden intention to initiate an uplink transmission.

According to aspects of the invention, a solution is proposed for solving the problem illustrated by FIG. 1 by identifying the channel access delay issue imposed on a RLLC STA, and communicating that with the serving AP to execute accordingly to guarantee a low E2E latency for uplink access of the STA. Examples according to the invention will be now be described with reference to FIGS. 2-6.

Figure 2:
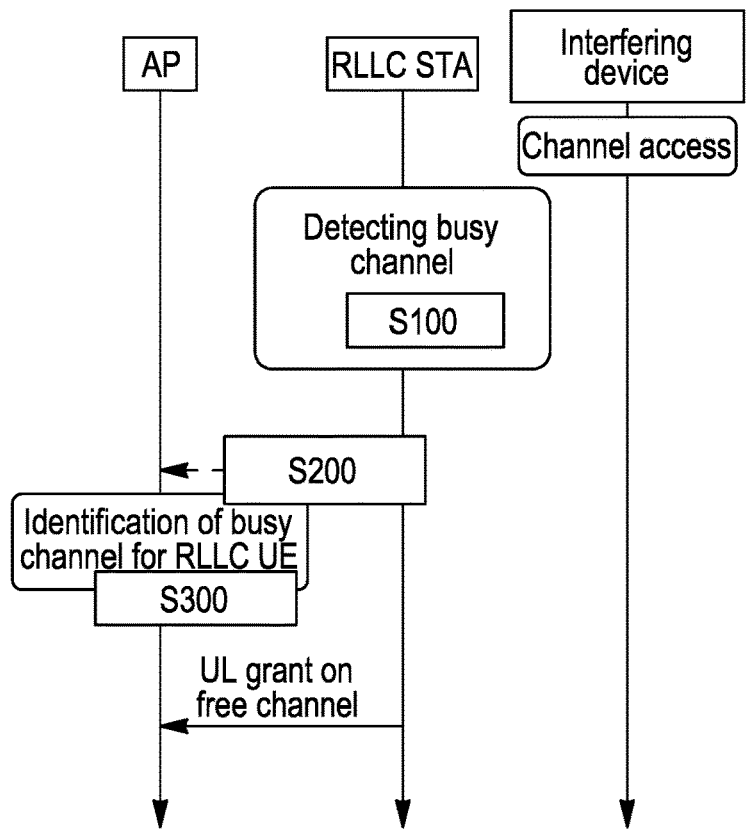
FIG. 2 shows an example of simplified operation flow according to embodiments of the invention.

Reference is now made to FIG. 2, which shows an example of simplified operation flow according to embodiments of the invention.

FIG. 2 shows the operation flow according to the invention in a wireless communication network comprising an AP, an associated RLLC STA and an interfering device.

At step S100, STA identifies a channel access delay problem due to busy medium.

According to some embodiments of the invention, the STA utilizes an unlicensed wireless frequency band (also called unlicensed "wireless interface") as a preferred alternative for data transmission. In some embodiments, a STA may transmit RLL-type traffic and will be hereinafter called RLLC STA. Furthermore, the devices according to some embodiments of the invention are multi-link, being equipped with at least two wireless interfaces. In fact, the terms "link" and "wireless interface" are interchangeable in the context of the invention. In particular, a device according to the invention may be equipped with two wireless interfaces comprising: a primary wireless interface, primarily utilized for data transmission operating in an unlicensed spectrum band (interchangeable with "first wireless interfaces"); and a back-up wireless interface (interchangeable with "secondary wireless interface"), utilizing a transmission channel or transmission band different from that utilized by the primary wireless interface.

According to some embodiments, the STA may determine that the channel primarily utilized for data transmission (here referring to the primary data channel in the unlicensed first wireless interface, which is the main channel utilized in the interface, hereinafter referred to as "first channel in the first unlicensed wireless interface") is busy or occupied due to the presence of an interfering device utilizing the same unlicensed channel for data transmission. As explained with reference to FIG. 1, the interfering device may be an interfering STA or an interfering AP.

At step S200, upon identification of the channel access delay problem, the multi-link STA according to some embodiments of the invention immediately transmits a message to the serving AP to indicate the detection of the busy channel. According to some embodiments, when the STA is utilized for RLLC data transmission, it may determine to send the message through a second wireless interface that utilizes a different transmission channel being different from the unlicensed first wireless interface. In other embodiments, the STA may determine to transmit a message even when the STA is not utilized for RLLC data transmission.

According to some embodiments of the invention, the message communicated from the STA to the AP may be a "first data channel busy" frame. In some embodiments, the message sent from the STA to the AP may comprise information such as a first field (F1), indicating that the unlicensed first channel utilized by the first wireless interface for uplink RLLC data transmission is identified as busy. In some embodiments, the message sent from STA to AP may comprise a second field (F2), indicating whether the transmission of the frame is triggered whether i) performing the countdown of a mandatory LBT phase prior to the uplink RLLC data transmission; or ii) monitoring channels without attempting data transmission. In the case where the transmission of the frame is triggered performing of the countdown of the LBT phase prior to the uplink data transmission, the method of the invention may enable a prevention of the channel occupancy issues. In the case where the transmission of the frame is triggered monitoring channels without attempting data transmission, the method of the invention may enable a fast reaction to the channel occupancy issues.

In some embodiments, the message sent from STA to AP may further comprise a third field (F3), being an indication of channel occupation information of an unoccupied unlicensed secondary channel in the same frequency band of the first wireless interface. In some embodiments, the message sent from the STA to the AP may further comprise a fourth field (F4), comprising the data payload for STA uplink transmission. Details in relation to information comprised in the message will be explained in more details in the following paragraphs with reference to FIGS. 3 and 4.

In some embodiments of the invention, the secondary wireless interface band may operate in the unlicensed spectrum, which may require that the multi-link STA executes a back-off procedure adjusted as per the previous indications of the serving AP. The serving AP will adjust the random back-off counters of the served multi-link STAs to prevent collisions when multiple STAs simultaneously detect the channel as busy and attempt to transmit the 'first data channel busy' message. In some embodiments of the invention, the multi-link STAs could utilize larger contention window sizes—utilized for determining the listening time before accessing the back-up unlicensed channel—to minimize the probability of collision. The multi-link STA usually refers to STA transmitting RLLC traffic.

In the embodiments where the secondary wireless interface band operates in the unlicensed spectrum, the method further involves the implementation of a logic to determine whether the data payload to be originally transmitted in the primary data channel should be directly sent through the secondary interface or not. The logic to determine whether to transmit the data payload through the secondary interface will be explained in more details in the following paragraphs.

In the embodiments where the secondary wireless interface operates solely in the unlicensed spectrum, the back-up link can be configured through a channel activity awareness process at the AP. In some embodiments of the invention, APs can identify one global back-up link for all connected STAs or determine back-up link on a per-STA or per-group-of-STA basis. A back-up link configuration signal can be sent out to an STA with a certain frequency that is determined by the AP based on the rate of channel activity variations in the network. The advertised back-up link can be acknowledged by the STAs to guarantee a reliable exchange of configuration information.

In some embodiments of the invention, the secondary wireless interface may operate in the licensed spectrum. In this case, the back-up link may be pre-configured, e.g., a NR licensed channel may be configured as back-up link for NR-U operation. Advantageously, the network operator could acquire a low-cost slice of licensed NR spectrum to enhance the low latency communication ongoing in the unlicensed band. The RLLC STAs could be then configured to perform the transmission of message to AP over the licensed band slice, e.g., through uplink grant-free access.

At step S300, upon reception of the message indicating that the first channel in the unlicensed first wireless interface utilized by the STA is busy, the serving AP will determine at least the scheduling information to be transmitted to STA if it is determined that information will be generated to schedule the uplink data transmission.

In the case where it is determined that information will be generated based on the received message from the STA, the AP identifies the busy channel by evaluating the availability of the first channel in the first wireless interface for AP, and determines the scheduling information i.e. in which channel the STA should transmit in uplink. The details for determining the scheduling information will be described in more details in the following paragraphs.

In some embodiments of the invention, the AP may also decide to permanently change the first channel in the unlicensed first wireless interface used for data transmission.

According to embodiments of the invention, the solution of the invention enables a prevention of and/or fast reaction to channel occupancy issues that could introduce intolerable channel access delays for low-latency applications by strictly reserving and guaranteeing access to the secondary wireless interface for those transmissions that most necessitate it, that is, RLLC traffic according to some embodiments of the invention.

The main advantage of the method may be that the bandwidth of the backup channel (secondary wireless interface band) can be substantially less than that of the first channel that is used for data transfer. This is especially important when the secondary channel utilizes licensed spectrum since such spectrum is expensive. Through a sliver of licensed spectrum, the reliability of the service using a large swathe of unlicensed spectrum can be substantially enhanced, making it useful for RLLC communication.

Figure 3:
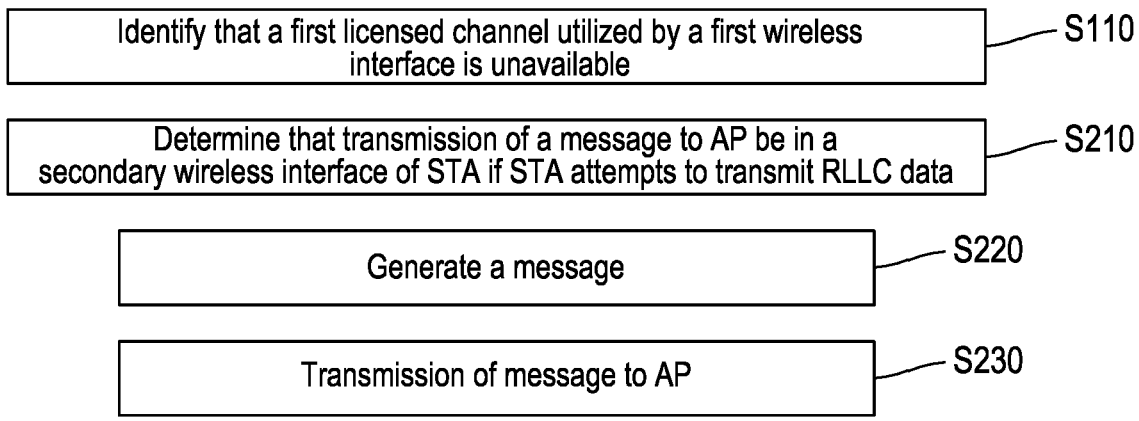
FIG. 3 shows examples of a simplified flow chart according to embodiments of the invention.
Figure 3:
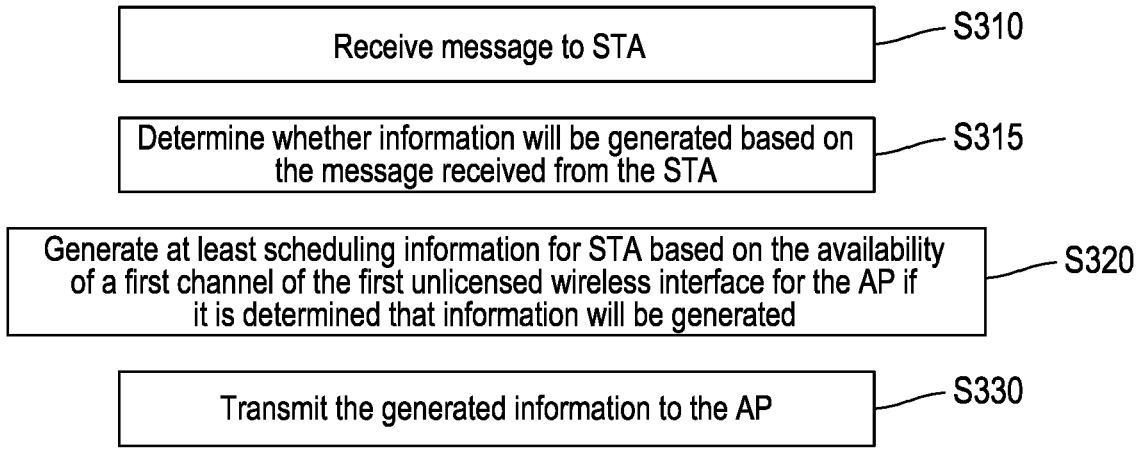

Turning to FIG. 3, which shows examples of a simplified flow chart according to embodiments of the invention, where description of the process of the invention are divided into STA implementation and AP implementation.

STA Implementation

According to some embodiments of the invention, an STA may perform the following steps:

Step S110—STA identifies that a first licensed channel utilized by a first wireless interface is unavailable.

According to some embodiments of the invention, The STA utilizing a first channel in an unlicensed first wireless interface as a preferred alternative for data transmission may identify this first data channel is occupied (i.e. there is a channel access delay problem) by the data transmission of another device such as an interfering AP or an interfering STA as explained above. The identification of the channel access delay problem may occur in either of the following situations: i) the identification occurs when the countdown of the mandatory LBT phase that precedes any data transmission in the unlicensed spectrum is stopped as per the rules of the first unlicensed wireless interface (e.g., energy detection and/or virtual carrier sensing in 802.11); or ii) the identification occurs when there is no data to transmit immediately (e.g., without formally commencing the mandatory LBT phase). The STA may monitor the channel continuously and determines high likelihood of failure of a potential LBT attempt in the sequel. For instance, as per the rules of the first unlicensed wireless interface, the STA identifies that the rate of channel occupancy is below a threshold where the requirements of a potential channel access attempt by its application (such as RLLC application) can be met.

Step S210—STA determines that transmission of a message to AP be in a secondary wireless interface of STA if STA is utilized to transmit RLLC data.

According to some embodiments of the invention, upon identification of a channel access delay problem, the STA determines to transmit a message to inform the AP that the first channel of the unlicensed first wireless interface is busy. The STA may determine to transmit such a message based on the identification that the first channel of the unlicensed first wireless interface is not available.

According to some embodiments of the invention, the secondary wireless interface is reserved for those transmission that most necessitate it (such as RLLC data) in order to prevent undesired collisions in this back-up wireless interface. In this case, only the STA attempting to transmit RLLC data (RLLC STA) is allowed to send a message to the serving AP through the secondary wireless interface—other STAs (such as broadband traffic STA) cannot utilize the secondary wireless interface and needs to wait until the first channel in the unlicensed first wireless interface is available. In some other embodiments where the STA is not utilized to transmit RLLC data, a message may be sent to the serving AP but not through the secondary wireless interface.

Step S220—STA generates a message

According to some embodiments of the invention, the message to be sent from STA to AP may comprise the indication—for example in the form of a First Field (F1) that the first unlicensed channel utilized for transmission has been identified as not available (busy). The message may also comprise the indication in relation to the situation during which the identification of busy channel occurs—for example, in the form of a Second field (F2) such as, i) when performing the countdown of the mandatory LBT phase prior to data transmission or ii) when monitoring the channel without attempting data transmission.

According to further embodiments of the invention, the message may comprise an indication of unoccupied unlicensed channels in the same frequency band of the first wireless interface, for example in the form of a third field (F3). Furthermore, according to some other embodiments of the invention, the message may comprise the data payload to be originally transmitted in the primary channel, for example in the form of a Forth field (F4). More details of the determination whether to include F3 and/or F4 in the message will be discussed with reference to FIG. 4 (steps S221 and S222).

Step S230—immediate transmission of message to AP

In some embodiments of the invention, the STA sends the generated message to the serving AP.

AP Implementation

According to some embodiments of the invention, the serving AP may perform the following steps:

Step S310—AP receives message from STA

Step S315—AP determines whether information will be generated based on the message received from STA In some embodiments of the invention, the AP may determine based on the message received from the STA whether it is necessary to generate any information. In some embodiments, the data payload of the STA is already comprised in the message, thus there is no need for the AP to generate and transmit any information and the process terminates.

In some other embodiments of the invention, it is determined based on the message received from the STA that information will be generated, the process continues to step S320.

Step S320—if it is determined that information will be generated at step S315, AP generates at least scheduling information for STA based on the availability of a first channel of the first unlicensed wireless interface for the AP. In some embodiments of the invention, the scheduling information may indicate in which channel the STA should transmit in uplink. More details about determining at least the scheduling information will be discussed with reference to FIG. 4 (steps S321, S322, S323, S324, S327, S328, S329).

Step S330—AP transmits immediately the generated information to the STA. In some embodiments, the generated information comprises at least scheduling information. In some embodiments of the invention, the scheduling may be performed by sending the scheduling information in the channel as determined in step S320. More details about transmitting at least the scheduling information to STA will be discussed with reference to FIG. 4 (steps S331, S332).

Figure 4:
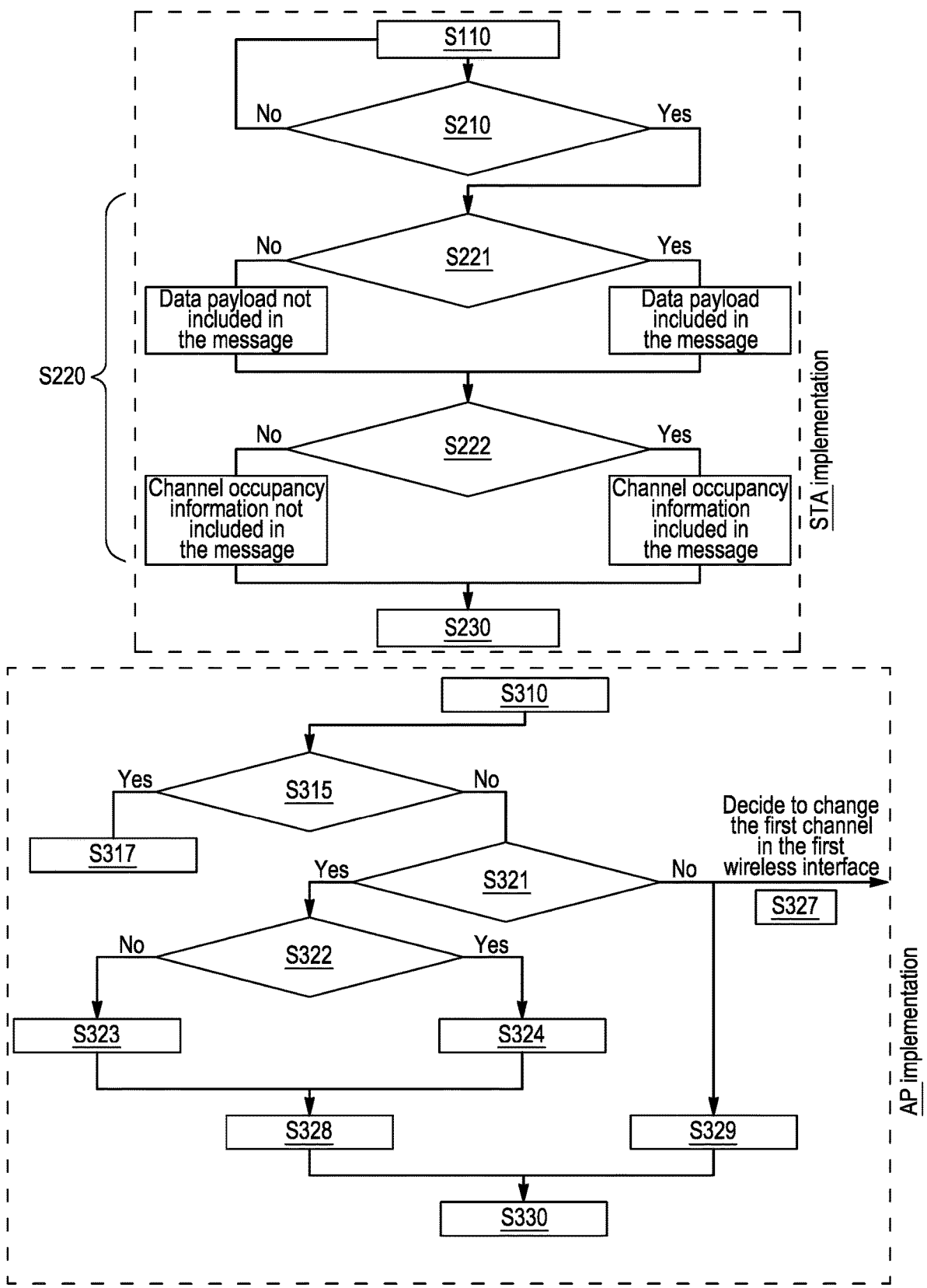
FIG. 4 shows examples of a flow chart in more details according to embodiments of the invention.

FIG. 4 shows examples of a flow chart in more details according to embodiments of the invention. In the following description, attention will only be given to those details having not been discussed before. Description of the common steps between FIG. 3 and FIG. 4 will not be repeated here.

STA Implementation

According to some embodiments of the invention, generating the message to be sent to AP (step S220) may further comprise the following steps: Step S221—STA determines whether to include data payload (F4) in the message, and/or Step S222—STA determines channel occupancy information (F3) to be obtained based on the capability of STA for sensing multiple channels.

At step S221, STA determines whether to include data payload (F4) in the message. In some embodiments of the invention, data payload (F4) may be included in the message if both of the following two conditions are met: i) the STA identified channel access delay problem when performing LBT (as the situation i) of step S110 of STA implementation); ii) the data payload to be transmitted in the first channel satisfies a set of conditions specified by the serving AP.

According to some embodiments of the invention, condition ii) as specified by the serving AP may relate to the size of the data frame. In some examples according to the invention, the size of the data frame (for example a RLL frame) is larger than that allowed for immediate transmission in the secondary wireless interface, F4 in the message is empty, in other words, no data payload will be included in the message.

At step S222, STA determines channel occupancy information (F3) to be obtained based on the capability of STA for sensing multiple channels. In some embodiments of the invention, if the STA implements the capability of sensing multiple channels, an indication of unoccupied unlicensed channels in the same frequency band of the first wireless interface (F3) may be provided.

According to some embodiments implemented in 802.11, i) the STA may provide channel occupancy information either on the secondary channels, then the STA will be immediately scheduled during AP implementation through channel bonding and uplink OFDMA; or ii) the STA may provide channel occupancy information on other channels not currently utilized as secondary channels that the AP can utilize as candidates for first channel switching/permanently changing and feed to the "channel selection algorithms"

AP Implementation

Step S315—determining whether information will be generated based on the message received from STA In some embodiments of the invention, the AP may determine to not generate information if the data payload (F4) is already comprised in the message received from the STA (step S317). The AP may not need to generate and transmit any information and the process may terminate. In some other embodiments, the data payload of the STA is not comprised in the message, it is then determined that information will be generated and process moves to step S320.

Step S320—generating at least scheduling information may further comprise the following steps:

Step S321—AP determines whether the first channel of the first wireless interface is available for AP.

At step S322, after it is determined that the first channel in the unlicensed first wireless interface is available for the serving AP, generating the scheduling information further comprises selecting a second channel based on the message received from the associated STA. According to some embodiments, selecting a second channel may be based on the channel occupancy information (F3).

In some embodiments, the channel occupancy information is not included in the message, in other words, the multi-link RLLC STA does not provide information related to alternative candidate channels for uplink transmission as per F3 of the message—e.g., because of complexity or power consumption reasons—the serving AP may monitor the unlicensed channels whenever possible to identify the channels being occupied by the hidden node signaled through the message. According to some embodiments, the serving AP may sense the medium in the first channel with extended listening range through a more stringent energy detection threshold in order to select a secondary channel (step S323).

In alternative embodiments, the channel occupancy information is included in the message, the serving AP may select secondary channel in the first wireless interface based on the channel occupancy information provided in the message (step S324).

At step S328, the AP generates the scheduling information indicating STA for uplink transmission in selected secondary channel in the first wireless interface through OFDMA where the first channel in the unlicensed first wireless interface is available for the serving AP.

At step S329, If the first channel in the unlicensed first wireless interface is also not available for the serving AP (i.e. AP also senses the first channel as busy), the latter generates the scheduling information indicating STA to transmit data payload in a second wireless interface. In some embodiments of the invention, the serving AP can determine the device occupying the channel has an overlapping coverage area (i.e., it is not hidden to the AP). This entails that the serving AP cannot solve the problem immediately through uplink scheduling in a different channel. In this case, immediately scheduling the uplink data transmission through the secondary wireless interface is the only feasible alternative to solve the channel access delay issue.

In addition to steps S328 and S329 of generating the scheduling information, the AP may also determine to permanently change the first channel utilized for data transmission in the unlicensed first wireless interface (step S327). To this end, a change to the first channel may be input to "channel selection algorithms" and the latter may change the first channel utilized for data transmission in the unlicensed first wireless interface. In some embodiments, this step may be applied on a slow time scale or sporadically.

Step S330 transmission of the generated information (such as the scheduling information) to STA may further comprise the following steps: S331 transmission of scheduling information in the first channel (primary channel) of the first wireless interface; and alternatively S332 transmission of scheduling information in the secondary wireless interface. According to some embodiments of the invention, the first channel of the first wireless interface refers to the channel primarily utilised for data transmission, and it is the main channel of the interface.

According to some embodiments of the invention, the scheduling is performed by sending the scheduling information to the STA.

In some embodiments implemented in 802.11, at step S331, where it is determined that the first channel of the first wireless interface is available for AP, the AP communicates an uplink scheduling grant (scheduling information) through a control trigger frame transmitted in the first data channel of the unlicensed first interface—which is likely busy as per the indication of the STA. The affected STA may commence an uplink-triggered OFDMA transmission in a secondary channel of the unlicensed first wireless interface after decoding the control trigger frame.

In some other embodiments, at step S332, where it is determined that the first channel of the first wireless interface is not available for AP, the AP immediately schedules the uplink data transmission through the secondary wireless interface by transmitting the scheduling information to STA in the secondary wireless interface.

Figure 5:
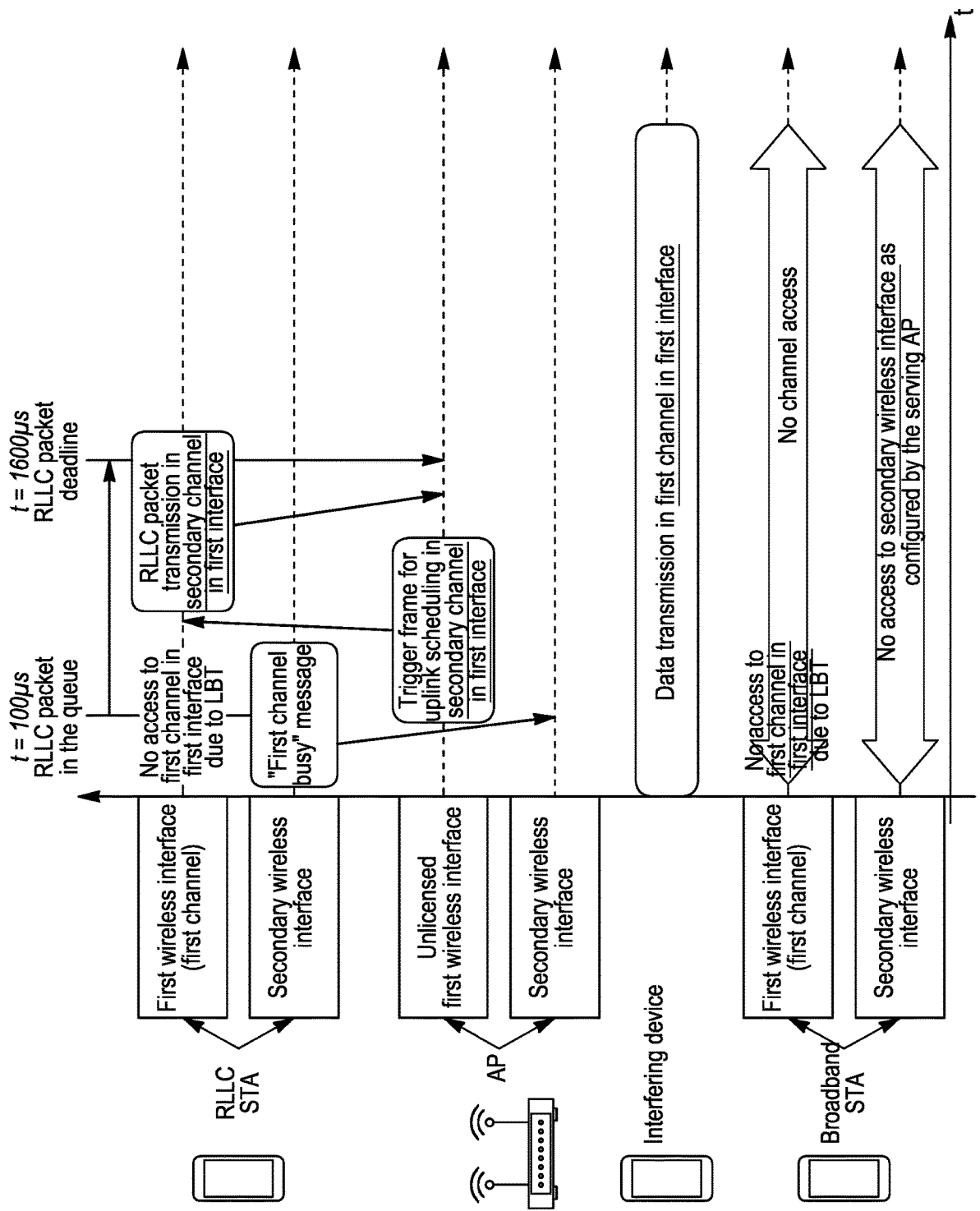
FIG. 5 illustrates an example of operations performed and messages exchanged according to some embodiments of the invention, based on the same scenario as illustrated in FIG. 1.

FIG. 5 illustrating an example of operations performed and messages exchanged according to some embodiments of the invention will now be described. As FIG. 5 is based on the same scenario illustrated in FIG. 1, similar descriptions are not repeated here.

At t=100 µs, upon reception of an uplink RLL packet in its queue for transmission, the multi-link RLLC STA identifies a channel access delay problem in its first channel of the unlicensed first wireless interface (primarily utilized for data transmission) due to busy medium (interfering device transmitting data in the first channel in the first interface). Meanwhile, the broadband STA also identifies the channel access delay problem in its first channel of the unlicensed first wireless interface.

In some embodiments, the serving AP may apply restrictions on the devices that wish to transmit in a secondary wireless interface different from the unlicensed first wireless interface as the secondary wireless interface is reserved for the transmission most necessitate it. In the example of FIG. 5, only the device attempting to transmit RLL-type traffic is allowed to transmit, for instance a message, in the secondary wireless interface. In this case, the broadband STA cannot utilize the secondary wireless interface and needs to wait until the first channel in the unlicensed first wireless interface finishes. The RLLC STA transmits the "first data channel busy" message in the secondary wireless interface to the serving AP.

It can be understood by a person skilled in the art that the determination for transmission of a message to be in the secondary wireless interface may be based on the type of traffic that STA attempts to transmit, as illustrated in FIG. 5. Where the STA does not attempt to transmit RLLC traffic, such as the case of the broadband STA, the STA may still determine to transmit a message but not in the secondary wireless interface.

In the example of FIG. 5, the message may be in the form of a frame, comprising the following information: a first field (F1) indicating that the first unlicensed channel utilized for transmission has been identified as busy; a second field (F2) indicating that the transmission has been triggered when performing the countdown of the mandatory LBT phase prior to data transmission; a third field (F3) indicating that the adjacent secondary channel in the first wireless interface is currently sensed as free by the multi-link RLLC STA; a forth field (F4) being empty, since the size of the RLL frame to transmit is larger than that allowed for immediate transmission in the secondary wireless interface, as specified by the serving AP.

In some embodiments of the invention, the forth field (F4) may be the data payload to be originally transmitted in the unlicensed first channel. In this case, STA may include its data payload in the message that is sent over the secondary interface.

Upon reception of the message from the RLLC STA, the serving AP determines that information will be generated because a fourth field (F4) of the received message is empty. The AP then determines whether the first channel of the unlicensed first wireless interface is also busy for the AP.

In the example of FIG. 5, it is determined that the first channel of the unlicensed first wireless interface is not busy, i.e. the first channel is available for the AP, the latter communicates the scheduling information in the first channel of the unlicensed first wireless interface (which is busy for the RLLC STA) to the RLLC STA. In some embodiments, the control trigger frame is relatively short and utilizes a robust MCS for increasing the likelihood that the RLLC STA correctly decodes it.

In the examples of FIG. 5, the AP schedules the broadband STA in the first channel of the unlicensed first wireless interface (primary channel) because first, scheduling an uplink transmission without occupying the primary channel is not allowed and second, the STA is unaware that the broadband STA cannot access the primary channel.

In the examples of FIG. 5, the AP schedules the RLLC STA in the secondary channel in the first wireless interface.

Before the deadline for transmission RLLC packet at t=1600 μs, the STA commences uplink-triggered OFDMA transmission in the secondary channel in the unlicensed first wireless interface. The service requirements for RLLC uplink transmission are thus met.

Alternatively, although not shown in FIG. 5, where it is determined that the first channel of the unlicensed first wireless interface is also busy for the AP, the AP may schedule transmission of data payload in the secondary wireless interface.

Figure 6:
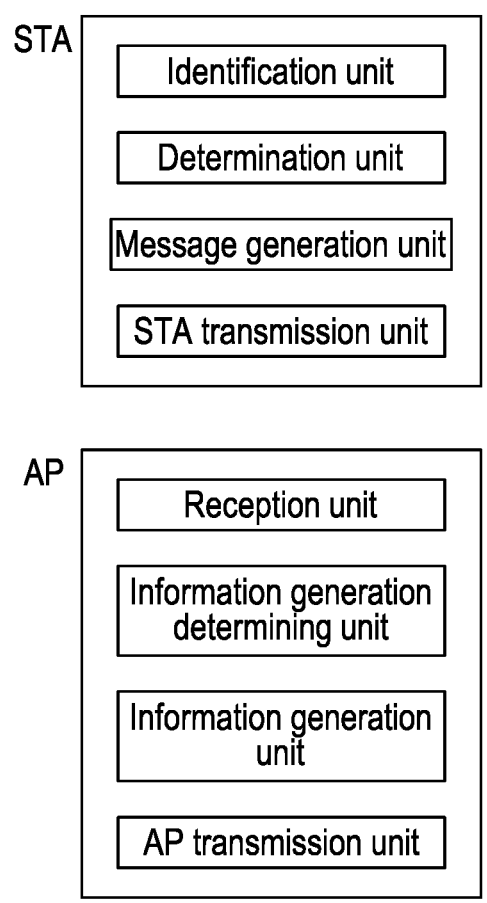
FIG. 6 shows example of overall arrangement of the system according to some embodiments of the invention.

FIG. 6 shows example of overall arrangement of the system according to some embodiments of the invention. The system in a wireless network for uplink transmission may comprises at least an AP of a BSS utilizing at least an unlicensed first wireless interface; and at least one Station STA associated to the AP utilizing at least a first unlicensed wireless interface.

According to some embodiments of the invention, the STA may further comprise a second wireless interface being different from the unlicensed first wireless interface; an identification unit, being configured to identify that a first channel utilized by the unlicensed first wireless interface is unavailable for the STA; a determination unit, being configured to, when identifying that the first channel utilized by the unlicensed first wireless interface is unavailable for the STA, determine that transmission of a message be in a secondary wireless interface of the STA if said STA attempts to transmit RLLC type traffic; a message generation unit, being configured to generate the message to be sent in the secondary wireless interface of the STA; and a STA transmission unit, transmitting the message to the serving AP.

According to some embodiments of the invention, the AP may further comprises a secondary wireless interface; a reception unit, being configured to receive the message transmitted from an associated STA; an information generation determining unit, being configured to determine whether information will be generated based on the message received from the associated STA; an information generation unit, being configured to generate at least scheduling information for the STA based on the availability of a first channel in the unlicensed first wireless interface for the AP if it is determined that information will be generated; and an AP transmission unit, being configured to transmit the generated information to the associated STA.

It will be appreciated that the functions depicted and described herein may be implemented in software (e.g., via implementation of software on one or more processors, for executing on a general purpose computer (e.g., via execution by one or more processors) so as to implement a special purpose computer, or the like) and/or may be implemented in hardware (e.g., using a general purpose computer, one or more application specific integrated circuits (ASIC), and/or any other hardware equivalents).

A further embodiment is a computer program product comprising a computer readable storage medium having computer readable program code embodied therein, the computer readable program code being configured to implement one of the above methods when being loaded on a computer, a processor, or a programmable hardware component. In some embodiments, the computer readable storage medium is non-transitory.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions where said instructions perform some or all of the steps of methods described herein. The program storage devices may be, e.g., digital memories, magnetic storage media such as magnetic disks and magnetic tapes, hard drives, or optically readable digital data storage media. The embodiments are also intended to cover computers programmed to perform said steps of methods described herein or (field) programmable logic arrays ((F) PLAs) or (field) programmable gate arrays ((F)PGAs), programmed to perform said steps of the above-described methods.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

While aspects of the present disclosure have been particularly shown and described with reference to the embodiments above, it will be understood by those skilled in the art that various additional embodiments may be contemplated by the modification of the disclosed machines, systems and methods without departing from the scope of what is disclosed. Such embodiments should be understood to fall within the scope of the present disclosure as determined based upon the claims and any equivalents thereof.

The invention claimed is:

1. An apparatus, comprising: at least one processor; and at least one memory storing instructions,
    that when executed by the at least one processor cause the apparatus:
    on a station utilizing at least an unlicensed first wireless interface transmitting in uplink to a serving access point of a same basic service set in a wireless network, at least to:
    with a second wireless interface being different from the unlicensed first wireless interface;
    identify that a first channel utilized by the unlicensed first wireless interface is unavailable for the station;
    when identifying that the first channel utilized by the unlicensed first wireless interface is unavailable for the station, determine that transmission of a message be in a secondary wireless interface of the station if said station attempts to transmit reliable and low latency type traffic; generate a message to be sent to the serving access point; and
    transmit the message to the serving access point;
    determine whether to include data payload in the message; and
    obtain channel occupancy information based on a capability of the station for sensing multiple channel.

2. The apparatus according to claim 1, wherein the at least one memory is storing instructions, that when executed by the at least one processor cause the apparatus at least to: when an interfering device is utilizing the same unlicensed channel for data transmission, identify that the first unlicensed channel is unavailable for the station.

3. The apparatus according to claim 1, wherein the at least one memory is storing instructions, that when executed by the at least one processor cause the apparatus at least to: generate a message comprising at least:
    a first field, indicating that the first unlicensed channel utilized by the unlicensed first wireless interface for uplink RLLC data transmission is identified as unavailable; and
    a second field, indicating whether the transmission of the frame is triggered when:
    a) performing the countdown of a mandatory LBT phase prior to the uplink RLLC data transmission; or
    b) monitoring channels without attempting data.

4. An apparatus, comprising: at least one processor; and at least one memory storing instructions, that when executed by the at least one processor cause the apparatus:
    on a access point utilizing at least an unlicensed first wireless interface in communication with at least one associated station of a same basic service set in a wireless network, at least to:
    on a secondary wireless interface being different from the unlicensed first wireless interface;
    receive the message transmitted from the at least one associated station;
    determine whether data payload is included in the message; and
    determine that channel occupancy information is based on a capability of the at least one associated station for sensing multiple channel:
    determine whether information will be generated based on the message received from the associated station;
    generate at least scheduling information for the station based on the availability of a first channel in the unlicensed first wireless interface for the access point if it is determined that information will be generated; and
    transmit the generated information to the associated station.

5. The apparatus according to claim 4, wherein the at least one memory is storing instructions, that when executed by the at least one processor cause the apparatus: on a determine that information will be generated if the message received from the associated station comprises data payload for station uplink transmission.

6. The apparatus according to claim 4, wherein the scheduling information determined for the associated station comprises:
    access point scheduling station for uplink data transmission in a secondary wireless interface different from the first wireless interface if the first channel in the first wireless interface is not available for the access point; or
    access point scheduling station for uplink data transmission in a secondary channel in the first wireless interface if the first channel in the first wireless interface is available for the access point.

7. The apparatus according to claim 4, wherein the information generation circuitry further comprising circuitry configured to select a secondary channel based on a message received from an associated station after it is determined that access point schedules station for uplink RLLC data transmission in a secondary channel in the first wireless interface.

8. A method for use by a station utilizing at least a first wireless interface in a basic service set, comprising:
    transmitting in uplink to a serving access point of the same basic service set in a wireless network, wherein the station further utilizing a secondary wireless interface, the method comprises the step of:
    identifying that a first channel utilized by the unlicensed first wireless interface is not available for the station;
    determining that transmission of the message be in a secondary wireless interface of the station in a secondary wireless interface of the station if the station attempts to transmit reliable and low latency type traffic;
    generating a message to be sent to the serving access point; and
    transmitting the message to the serving access point,
    wherein generating a message to be sent further comprises the steps of:

determining whether to include data payload in the message; and determining channel occupancy information to be obtained based on the capability of station for sensing multiple channels.

9. The method of claim 8, wherein identifying the unavailability of a first channel utilized by the unlicensed first wireless interface for the station comprises observing when an interfering device is utilizing the same unlicensed channel for data transmission.

10. The method of claim 8, wherein it is determined to include data payload in the message if:

the unavailability of the first channel in the unlicensed first wireless interface is identified by the station when performing listen-before-talk-operation; and the data payload to be transmitted by the station satisfies conditions specified by a serving access point.

11. The method of claim 8, wherein determining channel occupancy information to be obtained comprises:

providing channel occupancy information in the message to be sent to the serving access point if the station has the capacity of sensing multiple channels; wherein channel occupancy information indicating unoccupied unlicensed channels in the same frequency band of the unlicensed first wireless interface comprises:

secondary channels; or other channels not currently utilized as secondary bonding channels.

12. A method for use by an access point utilizing at least a first wireless interface in a basic service set in a wireless network, wherein the access point further utilizing a secondary wireless interface, the method comprises the steps of:

receiving the message transmitted from an associated station of the same basic service set;

determining whether information will be generated based on the message received from the station;

generating at least scheduling information for station based on the availability of a first channel in the unlicensed first wireless interface to the access point if it is determined that information will be generated; and transmitting the generated information to the access point.

13. The method according to claim 12, wherein it is determined that information will be generated if the message received from the associated station comprises data payload for station uplink transmission.

14. The method according to claim 13, wherein generating at least scheduling information for station comprises evaluating the availability of the first channel in the first wireless interface for access point:

if the first channel in the first wireless interface is not available for access point, access point schedules station for uplink data in a second wireless interface rather than a first wireless interface; and if the first channel in the first wireless interface is available for access point, access point schedules station for uplink data transmission in a secondary channel in the unlicensed first wireless interface.

15. The method according to claim 13, wherein transmitting the generated information comprises transmitting the scheduling information in the first channel of the first wireless interface; or transmitting scheduling information in the secondary wireless interface.

16. The method of claim 14, wherein generating at least scheduling information for station comprises, when the first channel in the first wireless interface is not available for access point, access point scheduling station for transmission of data payload in a second wireless interface and access point deciding to change the first channel in the first wireless interface.

17. The method of claim 14, wherein generating at least scheduling information for station comprises after it is determined that access point schedules station for uplink RLLC data transmission in a secondary channel in the unlicensed first wireless interface, selecting a secondary channel based on a message received from an associated station.

18. The method of claim 17, wherein selecting a secondary channel further comprises:

sensing the medium in the primary data channel with extended listening range to select a secondary channel if a channel occupation information is not included in the message received from the associated station; or selecting a secondary channel based on the channel occupation information included in the message received from the associated station;

wherein the channel occupation information is an indication of unoccupied secondary channel in the same frequency band of the unlicensed first wireless interface, being provided if the station implements the capability of sensing multiple channels.

19. A non-transitory computer readable storage medium storing instructions which, when executed by a computer, cause the computer to perform a method according to claim 9.

* * * * *